United States Patent [19]

Hoye et al.

[11] 3,914,431
[45] Oct. 21, 1975

[54] CERTAIN TETRAORGANOTIN COMPOUNDS USED AS INSECTICIDES

[75] Inventors: Peter Albert Theodore Hoye; Roger Geoffrey Hargreaves, both of Stourbridge, England

[73] Assignee: Albright & Wilson Limited, Oldbury, England

[22] Filed: Mar. 1, 1974

[21] Appl. No.: 447,146

Related U.S. Application Data

[63] Continuation-in-part of Ser. No. 177,163, Sept. 1, 1971, abandoned.

[52] U.S. Cl. ............................................. 424/288
[51] Int. Cl.² ....................................... A01N 9/00
[58] Field of Search .............................. 424/288

[56] References Cited
UNITED STATES PATENTS 3,499,086  3/1970  Brueckner et al. ................. 426/286
3,702,360  11/1972  Graham ............................ 424/288

OTHER PUBLICATIONS

Chem. Berichte 50 pp. 1549–1556, (1917).

*Primary Examiner*—Leonard Schenkman
*Attorney, Agent, or Firm*—Robert P. Auber; Kenneth G. Wheeless; Robert Spector

[57] ABSTRACT

Compounds of the formula

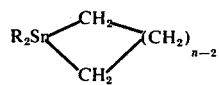

where R is a $C_{1-4}$ alkyl radical, an aryl, a cycloalkyl, an alkaryl or an aralkyl radical and $n$ is an integer from 4 to 6 are useful as insecticides.

4 Claims, No Drawings

CERTAIN TETRAORGANOTIN COMPOUNDS USED AS INSECTICIDES

BACKGROUND OF THE INVENTION

This application is a continuation-in-part of application Ser. No. 177,163, filed September 1, 1971 and now abandoned.

The present invention relates to organotin compounds which have insecticidal activity and to methods of preparing them.

The biocidal activity of compounds having 3 or 4 tin-carbon bonds is well established. We have now discovered that certain compounds falling within this class, which until now have been only academic curiosities, are effective insecticides. These compounds are of the formula

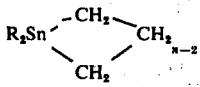

where each R represents an alkyl radical containing between 1 and 4 carbon atoms, cyclohexyl, benzyl, 2-ethylphenyl or phenyl radical and $n$ is an integer from 3 to 6, inclusive. This invention also provides insecticidal formulations containing compounds of the foregoing formula. The formulations may be wettable powders or other sprayable types, including dispersions of such compounds in suitable liquid vehicles. The formulations consist essentially of either (1) a dusting powder or a wettable powder containing the present compounds or (2) a suitable liquid diluent containing such compounds. In the latter case the compound can be present as a dispersed wettable powder.

Compounds of the formula

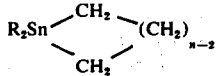

are known in the art [(see for example Chemische Berichte (1917) 50 pp 1549–1556)] and can be obtained by a Grignard type reaction from a diorganotin dihalide $R_2SnX_2$ with a Grignard reagent formed from an α,w-dihaloparaffin, $Y(CH_2)_nY$ and magnesium. X and Y are individually selected from chlorine, bromine and iodine. Representative compounds which can be prepared using this procedure include cyclopentamethylene dimethylstannane cyclopentamethylene di-n-propylstannane cyclopentamethylene dibenzylstannane cyclopentamethylene di(2-ethylphenyl)stannane cyclopentamethylene dicyclohexylstannane Homologs of the foregoing compounds wherein $n$ of the generic formula

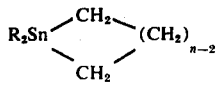

is 3, 4 or 6 are also included within the scope of the present invention as being effective insecticides. Cyclopentamethylene dibutylstannane and cyclopentamethylene diphenylstannane are particularly effective in combatting many species of insects including clothes moths larvae.

Formulations according to the invention can be in the form of (1) dusting powders, normally containing from 0.1 to 20% by weight (equivalent to between 1,000 and 200,000 parts per million) of the active organotin compound, the remaining portion being a solid carrier selected from lime, gypsum, talc, ash or kaolin; (2) wettable powders which can be sprayed following dilution with a suitable liquid, for example water (3) emulsions of the organotin compound in organic solvents such as kerosene, xylene or similar petroleum fractions or a ketone such as methyl isobutyl ketone or amyl acetate or dimethyl sulphoxide; or (4) aerosol formulations in which the active ingredient is emulsified as described in (3) and which also contain a substantial proportion of a propellant in the form of a volatile component and the whole formulation is held under a super atmospheric pressure in order to prevent evaporation of the propellent. The concentration of the organotin compound in dispersions, emulsions and aerosol formulations suitable for application as sprays is between 0.1 and 100 parts by weight per million of total formulation.

A further insecticidal application of the present formulations is in the moth proofing of textile fabrics. For example fabrics may be treated by being soaked in a solution formed by dissolving an organotin compound according to this invention in a volatile solvent such as acetone. Normally about 0.7 to 1.5% by weight of the compound based on the weight of the fabric will be required for a satisfactory formulation. The compounds may also be employed agriculturally as insecticides in amounts of from approximately 30 to 1,000 grams/acre.

Preparative methods for representative compounds within the scope of the present invention are described in the art, for example, in Chemische Berichte (1917) volume 50 pages 1551–1555. The following procedure is typical of those which can be employed to prepare the organotin component of the present formulations.

A 130 g. portion of diethyltin dibromide was gradually added to a rapidly stirred mixture containing the Grignard reagent prepared using 112 g. of 1,5-dichloropentane and 400 cc. of anhydrous diethyl ether. All of the solid material dissolved in the rapidly boiling ether. Following completion of the addition the reaction mixture was heated to reflux temperature using a water bath, after which the ether was removed by distillation and retained. The solid material remaining in the distilling flask was heated for 1 hour in a boiling water bath, after which the ether which had previously been removed was returned to the reaction vessel. An amount of water sufficient to hydrolyze the reaction product was then cautiously added. The ether layer was separated, washed with water, and dried using anhydrous calcium chloride, after which the ether was distilled at ambient pressure over anhydrous calcium chloride. The liquid remaining in the flask was distilled under reduced pressure and an atmosphere of carbon dioxide. The fraction boiling between 98° and 104°C. at a pressure of 17 mm. of mercury was collected and redistilled under a pressure of 14 mm. of mercury and vapor temperature (uncorrected) of 95°C. to yield analytically pure diethylcyclopentamethylene tin. The yield was at least 25 g. of a colorless, watery oil.

EXAMPLE

Two of the present organotin compounds were tested for insecticidal activity against four pest species from four of the major insect orders. Diazinon and Malathion were also tested as shown against some insects to provide a comparison.

| | | |
|---|---|---|
| *Musca domestica* | Common house fly | adult |
| *Tribolium confusum* | Confused flour beetle | adult |
| *Tineola bisselliella* | Common clothes moth | larva |
| *Aphis fabae* | Black bean aphid | adult |

Methods 1. *Musca*. Three four-day-old adult flies were tested on filter papers treated with acetone solutions of the compounds. One hour after treatment when the solvent had evaporated flies were confined under 7 cm. diameter aluminum rings covered by glass plates. Two concentrations were used and two replicates of each concentration with ten flies each. Knocked down flies were recorded hourly for 5 hours and at 24 hours.

The concentration used were 2.0 and $\mu g/cm^2$. Malathion and Diazinon at the same concentrations were used as a standard. 2. *Tribolium*. Adult beetles were tested on dry films produced by evaporating acetone solutions in petri dishes. The beetles were introduced when all the acetone had evaporated. Two concentrations were used and two replicates of 20 beetles at each concentration were tested. Mortalities were recorded at 1, 2, and 4 days.

The concentrations used were 2.0 and 20 $\mu g/cm^2$. Diazinon was used as a standard at concentrations of 2.0, 20 and 200 $\mu g/cm^2$. No mortalities were observed with the 2.0 or the 20 $\mu g/cm^2$ levels and the former has been omitted from the table of results. 3. *Tineola*. Three-week-old larvae were tested on 4 cm. discs of new undyed woolen cloth treated with acetone solutions of the compounds. When the solvent had evaporated the discs were weighed and placed in glass specimen tubes with 10 larvae each. Two concentrations and two replicates of each were used. Larval mortality and the loss in weight of the discs were recorded after 14 days.

The concentrations used were 0.1 and 1.0% on the weight of the wool, that is approximately 0.2 and 2.0 mg per disc.

4. *Aphis*. The wingless female stage was tested on dry films as for *Tribolium*. Two concentrations were used and two replicates of 10 aphids at each concentration were tested. Mortalities were recorded at 2 and 24 hours.

The concentrations used were 0.2 and 2.0 $\mu g/cm^2$. Diazinon was used as a standard at the same concentrations and at 20 $\mu g/cm^1$. The 0.2 $\mu g/cm^2$ level produced no control and is therefore omitted from the table of results.

The activity of the compounds against these insects is shown in the following table.

| COMPOUND | INSECT MUSCA | TRIB | TINIOLA | APHIS |
|---|---|---|---|---|
| $(nBu)_2 Sn(CH_2)_5$ | * | * | ** | |
| $Ph_2 Sn(CH_2)_5$ | * | * | ** | ** |
| Diazinon | * | — | | * |
| Malathion | * | — | — | |

**Indicates that the compound was active at the lower rate of application.
* Indicates that the compound was active at the higher rate of application only.

What is claimed is:

1. A method for killing insects which consists of applying to said insects an effective amount of a formulation containing between 0.1 and 200,000 parts per million, based on the weight of said formulation, of a tetraorganotin compound of the formula

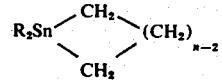

wherein each R represents alkyl containing between 1 and 4 carbon atoms, cyclohexyl, benzyl, 2-ethylphenyl or phenyl and n represents the integer 4, 5 or 6, the remainder of said formulation consisting essentially of an inert carrier selected from the group consisting of lime, gypsum, talc, ash, kaolin, water, organic liquids and volatile aerosol propellants.

2. The method of claim 1 wherein R represents butyl or phenyl.

3. The method of claim 1 wherein the formulation is in the form of a wettable powder.

4. The method of claim 1 wherein the formulation is in the form of a dusting powder containing between 0.1 and 20% by weight of the tetraorganotin compound.

* * * * *